(12) United States Patent
Hass

(10) Patent No.: US 10,077,591 B2
(45) Date of Patent: Sep. 18, 2018

(54) DOOR OPERATOR ASSEMBLY

(71) Applicant: ASSA ABLOY Accessories and Door Controls Group, Inc., Monroe, NC (US)

(72) Inventor: Brian D Hass, Torrington, CT (US)

(73) Assignee: ASSA ABLOY Accessories and Door Controls Group, Inc., Monroe, NC (US)

( * ) Notice: Subject to any disclaimer, the term of this patent is extended or adjusted under 35 U.S.C. 154(b) by 0 days.

(21) Appl. No.: 14/319,076

(22) Filed: Jun. 30, 2014

(65) Prior Publication Data

US 2014/0325911 A1    Nov. 6, 2014

Related U.S. Application Data

(63) Continuation of application No. 11/403,490, filed on Apr. 13, 2006, now abandoned.

(60) Provisional application No. 60/751,623, filed on Apr. 13, 2005.

(51) Int. Cl.
| | |
|---|---|
| *E05F 15/611* | (2015.01) |
| *E05F 3/22* | (2006.01) |
| *H02J 7/14* | (2006.01) |
| *E05F 15/60* | (2015.01) |
| *E05F 15/63* | (2015.01) |
| *E05F 15/70* | (2015.01) |
| *E05F 1/10* | (2006.01) |

(52) U.S. Cl.
CPC ............ *E05F 15/611* (2015.01); *E05F 3/224* (2013.01); *E05F 15/60* (2015.01); *E05F 15/63* (2015.01); *E05F 15/70* (2015.01); *H02J 7/14* (2013.01); *E05F 1/105* (2013.01); *E05F 3/227* (2013.01); *E05Y 2201/41* (2013.01); *E05Y 2201/604* (2013.01); *E05Y 2201/624* (2013.01); *E05Y 2201/686* (2013.01); *E05Y 2201/72* (2013.01); *E05Y 2400/302* (2013.01); *E05Y 2400/36* (2013.01); *E05Y 2400/614* (2013.01); *E05Y 2800/112* (2013.01); *E05Y 2800/113* (2013.01); *E05Y 2800/22* (2013.01); *E05Y 2800/252* (2013.01); *E05Y 2800/372* (2013.01); *E05Y 2900/132* (2013.01); *Y10T 292/57* (2015.04)

(58) Field of Classification Search
CPC . E05F 15/12; E05F 15/70; E05F 15/60; E05F 15/63; E05F 15/611
USPC ......... 49/138, 324, 339–341, 345, 358, 359; 318/375, 376; 16/85
See application file for complete search history.

(56) References Cited

U.S. PATENT DOCUMENTS

| | | | | |
|---|---|---|---|---|
| 1,543,935 A | * | 6/1925 | McGee | 49/101 |
| 1,941,454 A | * | 1/1934 | Ainsworth | 49/26 |
| 2,013,418 A | * | 9/1935 | Moore | 292/263 |

(Continued)

*Primary Examiner* — Gregory J Strimbu
(74) *Attorney, Agent, or Firm* — Dennis J. Williamson; Moore & Van Allen PLLC

(57) ABSTRACT

A combination door operator assembly and door, wherein the door operator assembly includes an operator unit mounted to the door on the pushing side thereof, an arm linkage having a driving arm and a driven arm, a mounting bracket on the frame of the door, a rechargeable power storage pack having at least one of a rechargeable battery and one or more capacitors, and a controller for monitoring a speed and a position of the door, wherein when the door moves faster than a predetermined speed, the motor is used as a generator to charge the rechargeable power storage pack and the speed of the door is reduced.

15 Claims, 17 Drawing Sheets

(56) References Cited

U.S. PATENT DOCUMENTS

| | | | | |
|---|---|---|---|---|
| 2,032,724 | A * | 3/1936 | Sharpe | 49/139 |
| 2,138,521 | A * | 11/1938 | Ellis | 49/28 |
| 2,170,014 | A * | 8/1939 | Ellis | 49/30 |
| 2,243,914 | A * | 6/1941 | Martin et al. | 49/280 |
| 2,758,835 | A * | 8/1956 | Wikkerink | 49/30 |
| 2,820,241 | A * | 1/1958 | Schlage | 16/49 |
| 2,874,960 | A * | 2/1959 | Durbin et al. | 310/93 |
| 3,114,541 | A * | 12/1963 | Coffey | 49/138 |
| 3,284,950 | A * | 11/1966 | Gute | 49/28 |
| 3,425,161 | A * | 2/1969 | Catlett et al. | 49/253 |
| 3,645,042 | A * | 2/1972 | Bolli | 49/326 |
| 3,934,306 | A * | 1/1976 | Farris | 16/48.5 |
| 3,996,698 | A * | 12/1976 | Rees et al. | 49/324 |
| 4,007,557 | A * | 2/1977 | Davis et al. | 49/139 |
| 4,045,914 | A * | 9/1977 | Catlett | 49/334 |
| 4,220,051 | A * | 9/1980 | Catlett | 74/89.25 |
| 4,348,835 | A * | 9/1982 | Jones et al. | 49/139 |
| 4,429,490 | A * | 2/1984 | Zunkel | 49/32 |
| 4,498,033 | A * | 2/1985 | Aihara et al. | 318/261 |
| 4,501,090 | A * | 2/1985 | Yoshida et al. | 49/264 |
| 4,551,946 | A * | 11/1985 | Yoshida et al. | 49/340 |
| 4,658,545 | A * | 4/1987 | Ingham et al. | 49/340 |
| 4,785,493 | A * | 11/1988 | Tillmann et al. | 16/53 |
| 4,972,629 | A * | 11/1990 | Merendino et al. | 49/25 |
| 4,973,894 | A * | 11/1990 | Johansson | 318/280 |
| 5,018,304 | A * | 5/1991 | Longoria | 49/340 |
| 5,040,331 | A * | 8/1991 | Merendino et al. | 49/25 |
| 5,063,337 | A * | 11/1991 | Evin | 318/617 |
| 5,193,647 | A * | 3/1993 | O'Brien, II | 185/40 R |
| 5,221,239 | A * | 6/1993 | Catlett | 475/342 |
| 5,243,735 | A * | 9/1993 | O'Brien, II | 16/64 |
| 5,278,480 | A * | 1/1994 | Murray | 318/626 |
| 5,392,562 | A * | 2/1995 | Carambula | 49/346 |
| 5,497,641 | A * | 3/1996 | Linde et al. | 70/257 |
| 5,513,467 | A * | 5/1996 | Current et al. | 49/340 |
| 5,515,649 | A * | 5/1996 | Strab | 49/280 |
| 5,543,692 | A * | 8/1996 | Howie et al. | 318/282 |
| 5,594,316 | A * | 1/1997 | Hayashida | 49/31 |
| 5,634,296 | A * | 6/1997 | Hebda | 49/345 |
| 5,687,507 | A * | 11/1997 | Beran | 49/340 |
| 5,727,348 | A * | 3/1998 | Arnell et al. | 49/25 |
| 5,770,934 | A * | 6/1998 | Theile | 318/469 |
| 5,838,129 | A * | 11/1998 | Luh | 318/400.15 |
| 5,878,530 | A * | 3/1999 | Eccleston et al. | 49/139 |
| 5,910,075 | A * | 6/1999 | Arnell et al. | 49/25 |
| 5,930,954 | A * | 8/1999 | Hebda | 49/345 |
| 5,956,249 | A * | 9/1999 | Beran et al. | 700/56 |
| 6,006,475 | A * | 12/1999 | Schwantes et al. | 49/341 |
| 6,038,895 | A * | 3/2000 | Menke et al. | 70/278.1 |
| 6,061,964 | A * | 5/2000 | Arnell et al. | 49/359 |
| 6,067,753 | A * | 5/2000 | Hebda | 49/345 |
| 6,177,771 | B1 * | 1/2001 | Kinzer et al. | 318/280 |
| 6,336,294 | B1 * | 1/2002 | Kowalczyk et al. | 49/339 |
| 6,430,871 | B1 * | 8/2002 | Hebda | 49/340 |
| 6,481,160 | B1 * | 11/2002 | Kowalczyk | 49/335 |
| 6,530,178 | B1 * | 3/2003 | Kowalczyk et al. | 49/334 |
| 6,553,717 | B2 * | 4/2003 | St. John et al. | 49/340 |
| 6,588,153 | B1 * | 7/2003 | Kowalczyk | 49/380 |
| 6,634,140 | B1 * | 10/2003 | Sellman | 49/340 |
| 6,754,990 | B2 * | 6/2004 | Pedemonte | 49/337 |
| 6,786,006 | B2 * | 9/2004 | Kowalczyk et al. | 49/334 |
| 6,786,671 | B1 * | 9/2004 | Eckendorff | 403/374.1 |
| 6,938,372 | B2 * | 9/2005 | Kennedy et al. | 49/138 |
| 7,298,107 | B2 * | 11/2007 | McMahon | 318/466 |
| 7,310,911 | B1 * | 12/2007 | Sellman | 49/340 |
| 7,316,096 | B2 * | 1/2008 | Houser et al. | 49/345 |
| 7,339,336 | B2 * | 3/2008 | Gregori | 318/282 |
| 7,405,530 | B2 * | 7/2008 | Keller, Jr. | 318/466 |
| 2002/0092237 | A1 * | 7/2002 | Hebda | 49/339 |
| 2003/0005639 | A1 * | 1/2003 | Kowalczyk | 49/340 |
| 2003/0205000 | A1 * | 11/2003 | Pagowski | 49/341 |
| 2004/0068935 | A1 * | 4/2004 | Ichikawa et al. | 49/25 |

* cited by examiner

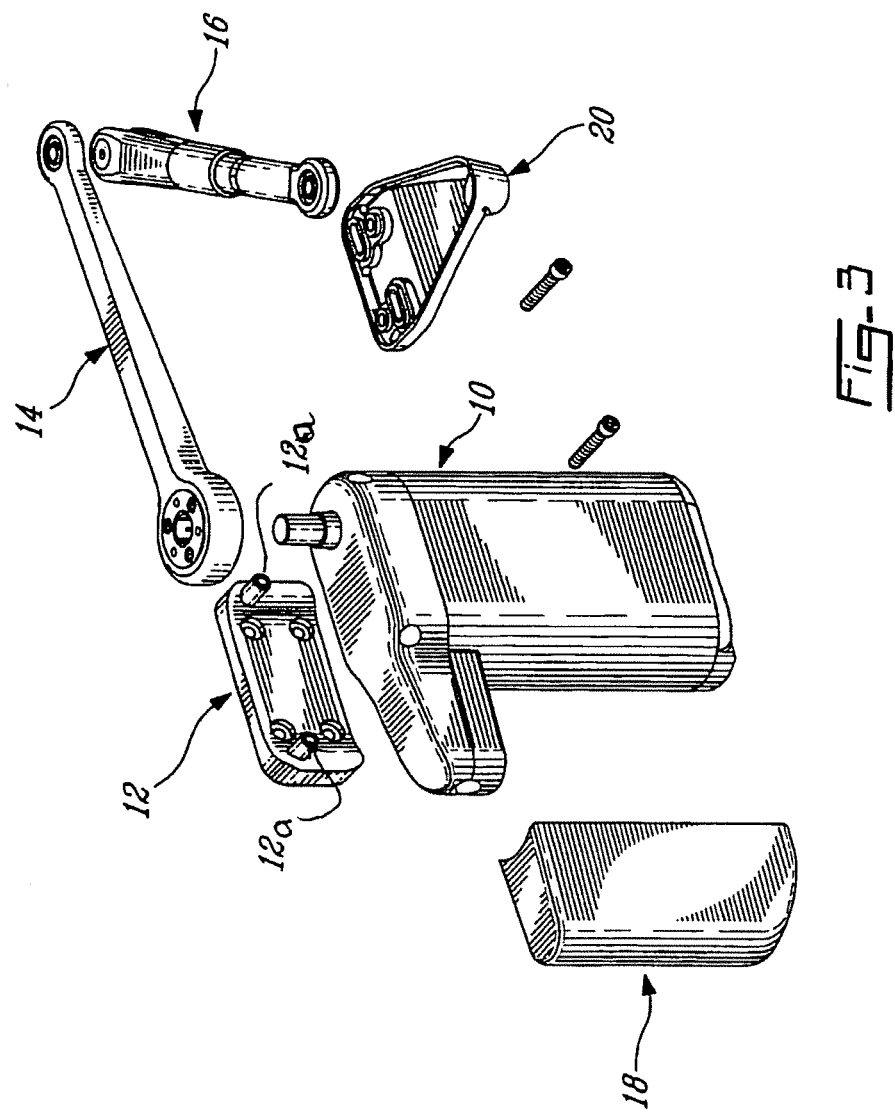

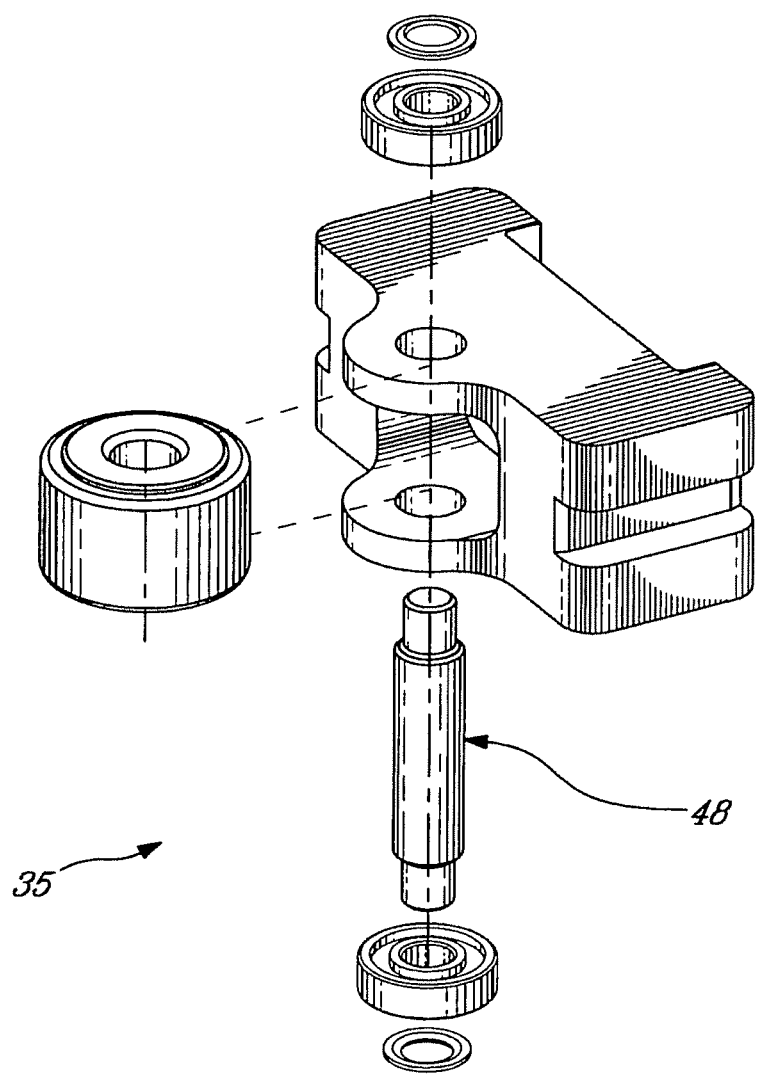
Fig_16

DOOR OPERATOR ASSEMBLY

CROSS REFERENCE TO RELATED APPLICATIONS

This application is an continuation of application Ser. No. 11/403,490, filed Apr. 13, 2006 now abandoned, which itself claims priority to and the benefit of U.S. provisional application No. 60/751,623, filed on Apr. 13, 2005. All documents above are incorporated by references as if fully set forth herein.

FIELD OF THE INVENTION

The present invention relates to door operators. More specifically, the present invention is concerned with a door operator assembly.

BACKGROUND OF THE INVENTION

Low energy door operators as illustrated in FIGS. 1 and 2 are typically used as manual doors. The door opens automatically by an action such as pressing an activation switch.

Installation of a low energy door operator is usually very expensive, since a typical installation requires an installer attaching a header to the frame of the door, which often requires custom mounting work, installing the operator in the header and installing door arms. Then, a licensed electrician is required to provide power to the door operator. The installer then has to return to complete "tune-in" of the door, including for example adjustments to ensure the door meets standard requirements.

Wind is a common cause of failure for exterior application swing door operators. The force of the wind on the door can cause the door to rapidly accelerate. When the door reaches the full open position all of the energy of the door must be absorbed in a very short period of time. These impact forces cause high stresses on the door operator, door arms, doors, doorframes, and mounting hardware. FIG. 15(a) illustrates a standard door operator mounting above the door, which causes very high stresses on the door aim linkages when the door is fully open and is forced by wind or a user and often causes significant problems since the arms are loaded in bending as well as in tension, causing high stresses on the door operator, causing failure of the operator or requiring the installation of an additional door stop.

Most available door operators provide different finishing options on the header, under the form of a large box, which mounts above the door and contains all of the electrical and mechanical components, which is a structural member of the system. Each door operator must be custom ordered to meet a desired finish.

There is a need in the art for door operator that mitigates the problems of the prior art.

SUMMARY OF THE INVENTION

More specifically, there is provided a door operator assembly, comprising an operator unit mounted to a first position, relative to the door, by a first mounting bracket; and an arm linkage connecting the operator unit and a second position, relative to the door; the arm linkage being mounted at the second position by a second mounting bracket.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 3 is an exploded view of a door operator assembly according to an embodiment of the present invention;

FIG. 16 is an exploded view of a roller assembly of a door operator assembly according to the present invention;

DESCRIPTION OF ILLUSTRATIVE EMBODIMENTS

Figure 1A:
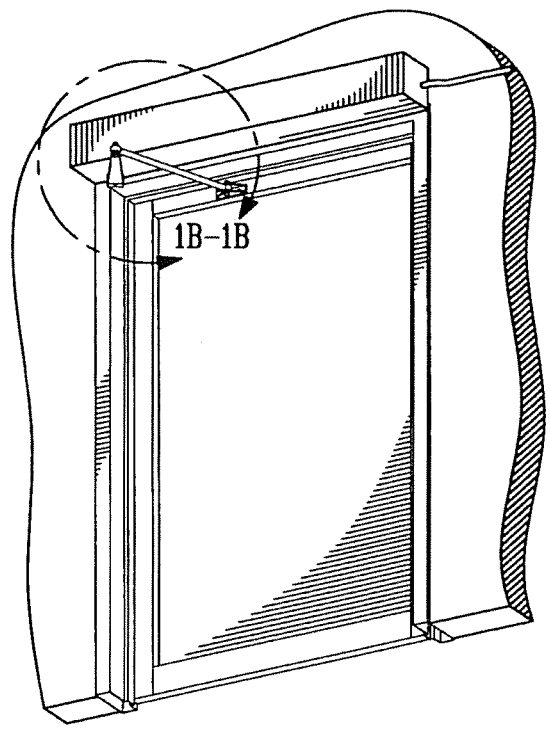
FIGS. 1A and 1B, hereinafter collectively referred to as FIG. 1, are views of a door operator system as known in the art.
Figure 1B:
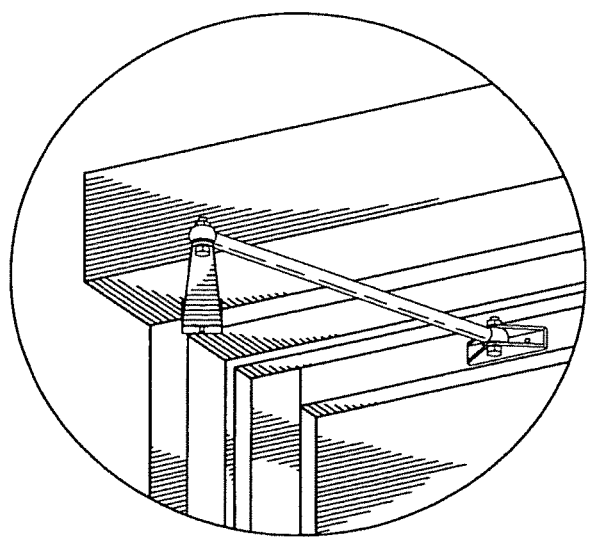
Figure 2A:
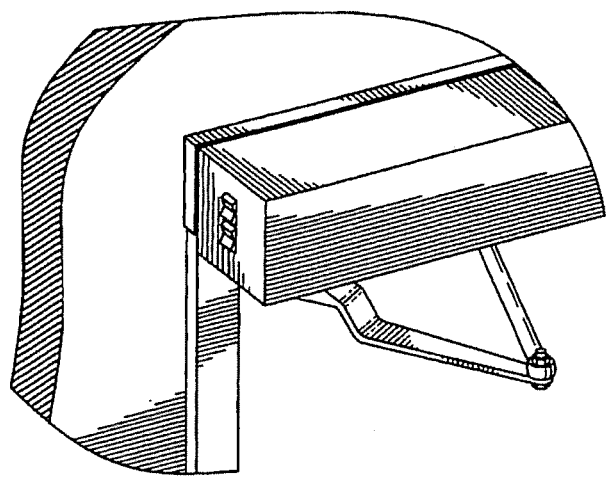
FIGS. 2A, 2B and 2C show close up views of a door operator system as known in the art.
Figure 2B:
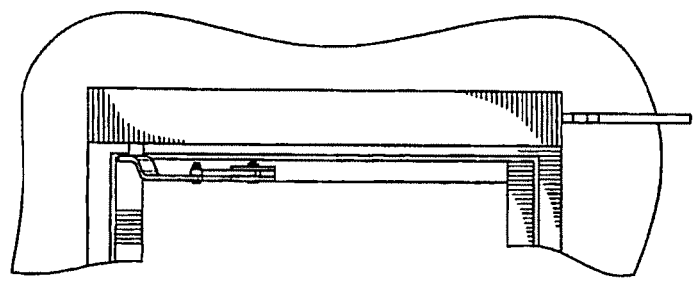
Figure 2C:
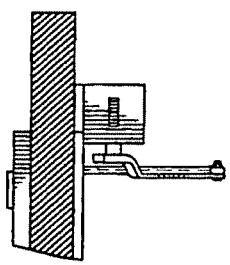

The present invention is illustrated in further details by the following non-limiting examples.

As illustrated in FIG. 3, a door operator assembly of the present invention comprises an operator unit 10 and a linkage 14, 16.

The operator unit 10 is connected to a power storage pack 18 and is preferably mounted on a door (not shown in FIG. 3), with a first mounting bracket 12. A first end of the linkage is coupled to the operator unit, and the linkage, as an assembly, couples the operator unit to the frame of the door, by having the other end of the linkage coupled to a second mounting bracket 20 on the frame of the door.

The first mounting bracket 12 comprises two posts 12a for example, and is of reduced dimensions, allowing an easy mounting.

Figure 4:
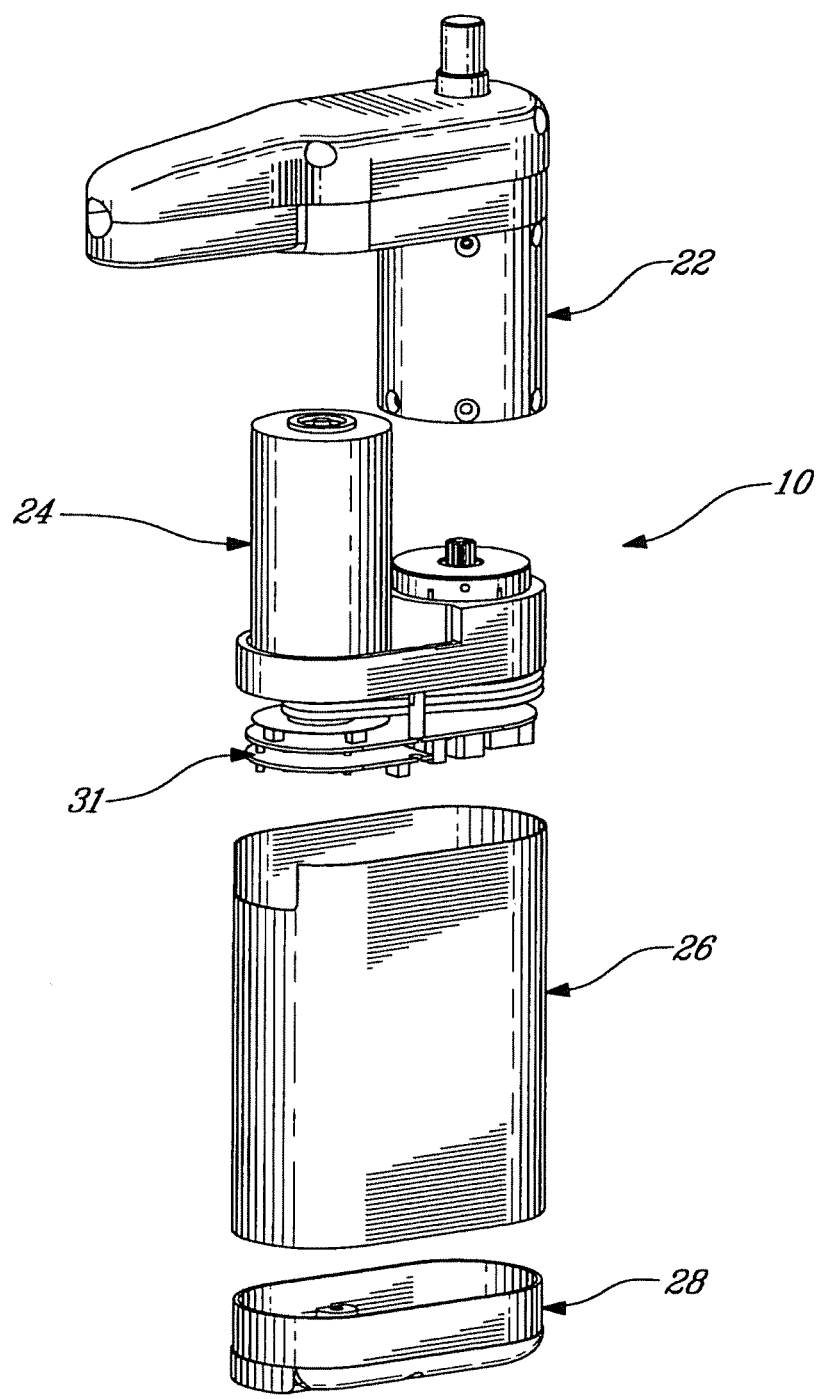
FIG. 4 is an exploded view of an operator unit in a door operator assembly according to an embodiment of the present invention.

As illustrated in FIG. 4, the operator unit 10 comprises an output drive unit 22, an input drive unit 24 with controls 31, a cover 26 and a control cover 28.

The cover 26 may be used to provide a finished look to the door operator assembly. It is a non-structural member, and may be easily changed. As a result, a number of different finishes may be provided, eliminating the requirement for distributors to stock a number of different door operator assemblies to meet customer needs. Additionally, the covers can be replaced without any need to remove the door operator assembly from the door, so the covers can be changed to a custom finish at any time.

Power is supplied to a motor 30 in the input drive unit 24 by the power storage pack 18. Motor control is achieved by the controller 31 with an integral magnetic or optical encoder (see FIG. 6).

Figure 13:
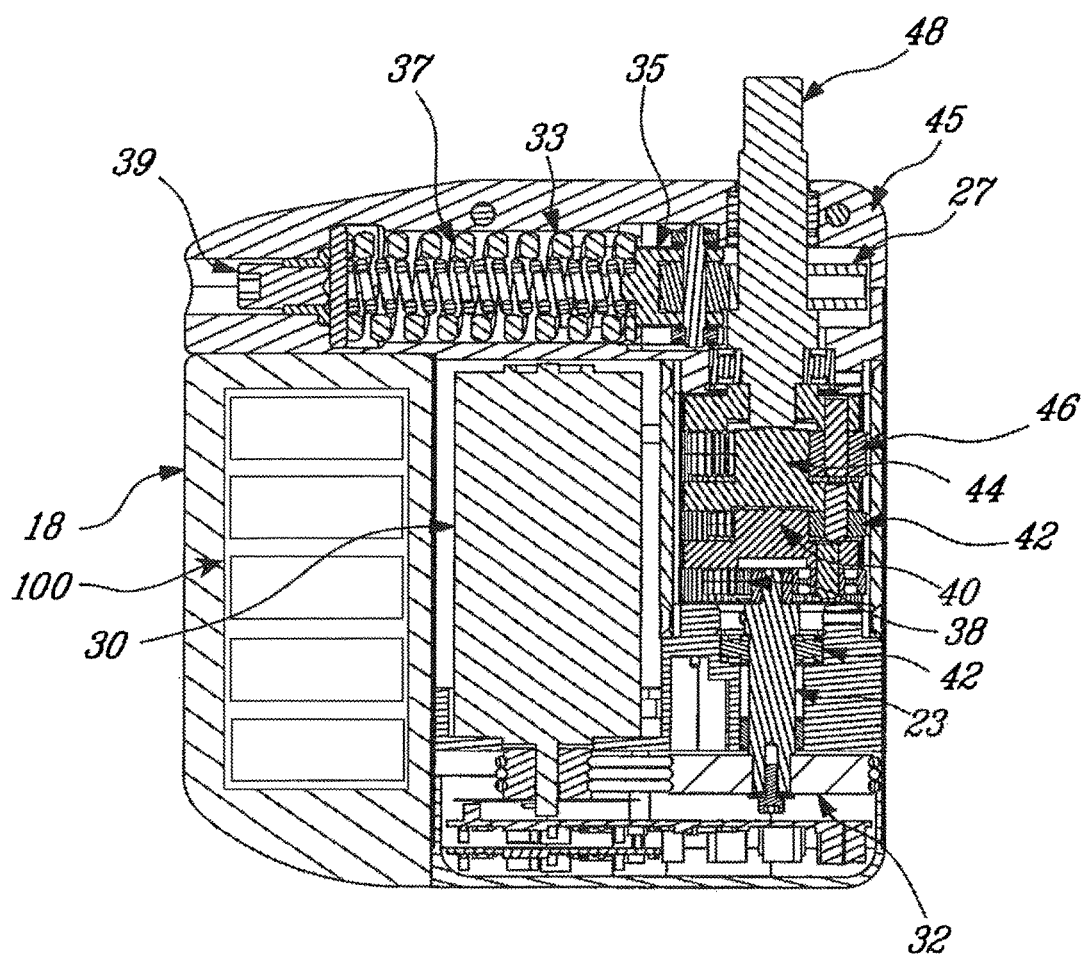
FIG. 13 is cross sectional view of an operator unit in a door operator according to the present invention.

The power storage pack 18 is a self-contained power storage pack, comprising batteries or high capacity capacitors, shown by reference number 100 in FIG. 13 for example, or alternative means as known in the art.

The present door operator assembly uses low voltage power. It may be powered by the power storage pack 18, or a low voltage transformer plugged into an outlet, or both (battery backup). This means that no licensed electrician or trained installer is required for installation of the present door operator assembly.

As the present door operator assembly is typically used as a manual door with occasional activation by remote or push plate, part of the energy used to operate the door manually is recaptured and used to recharge the power storage pack 18. This allows the batteries to be constantly charged without having to remove and replace the power storage pack 18. If it is necessary to replace the batteries for charging purposes, the power storage pack 18 is easily removable.

A low battery LED may be provided as an indicator of low batteries, which may happen for example in case of misapplication of the door operator assembly or in case of automatic cycles outnumbering manual cycles required to generate power as will be described hereinafter. In this case, an optional plug in transformer may be used.

No wires are required to be run to the door operator assembly. As a result, the door operator assembly may be mounted according to a range of mounting arrangements, described hereinafter. Moreover, by using Radio Frequency remote control to activate the door operator assembly, the present door operator may be totally self-contained.

Figure 5:
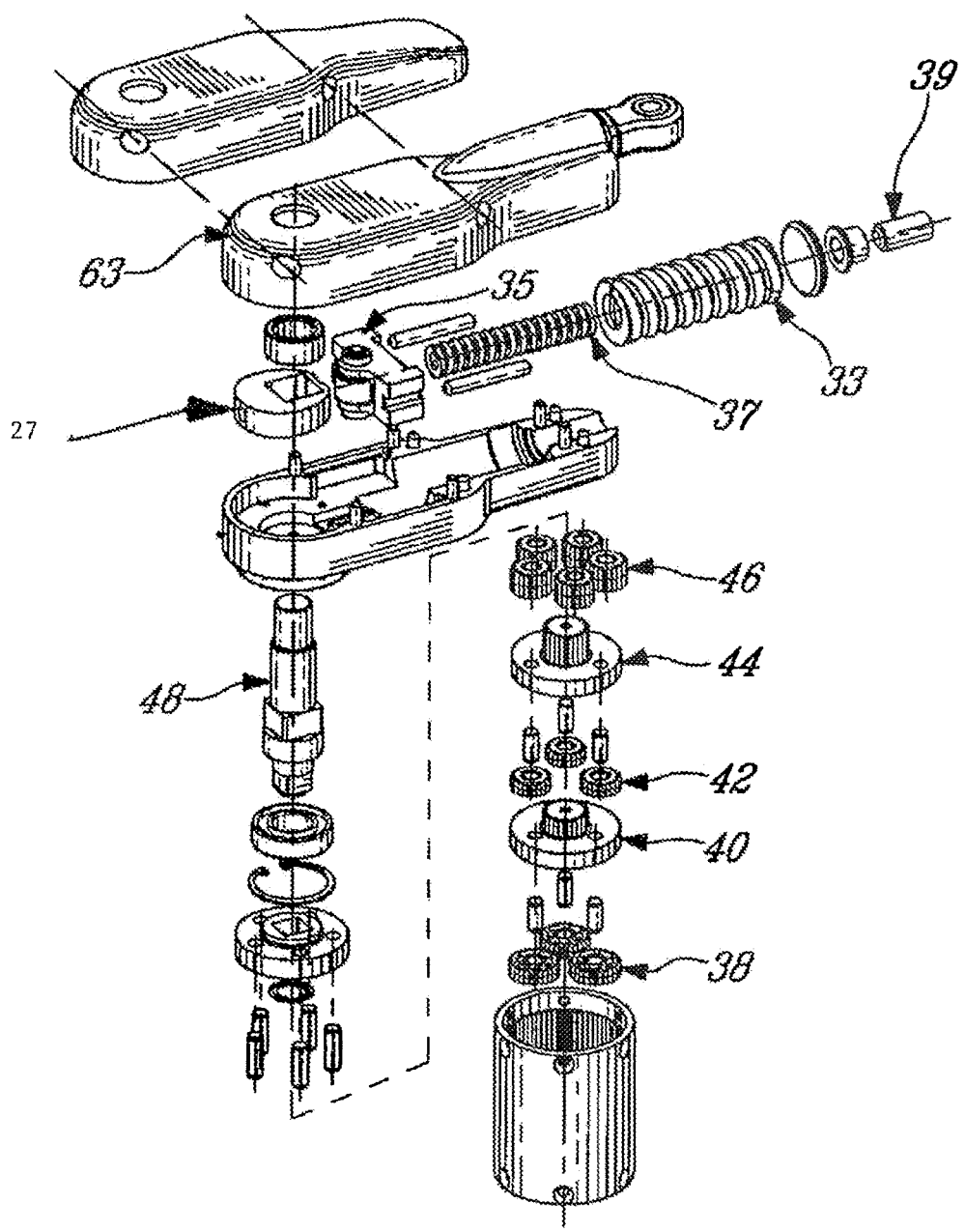
FIG. 5 is an exploded view of an output drive unit of the operator unit of FIG. 4.

As seen in FIG. 5, the output drive unit 22 comprises an output shaft 48, a spring assembly, and a planetary gear train.

Figure 6:
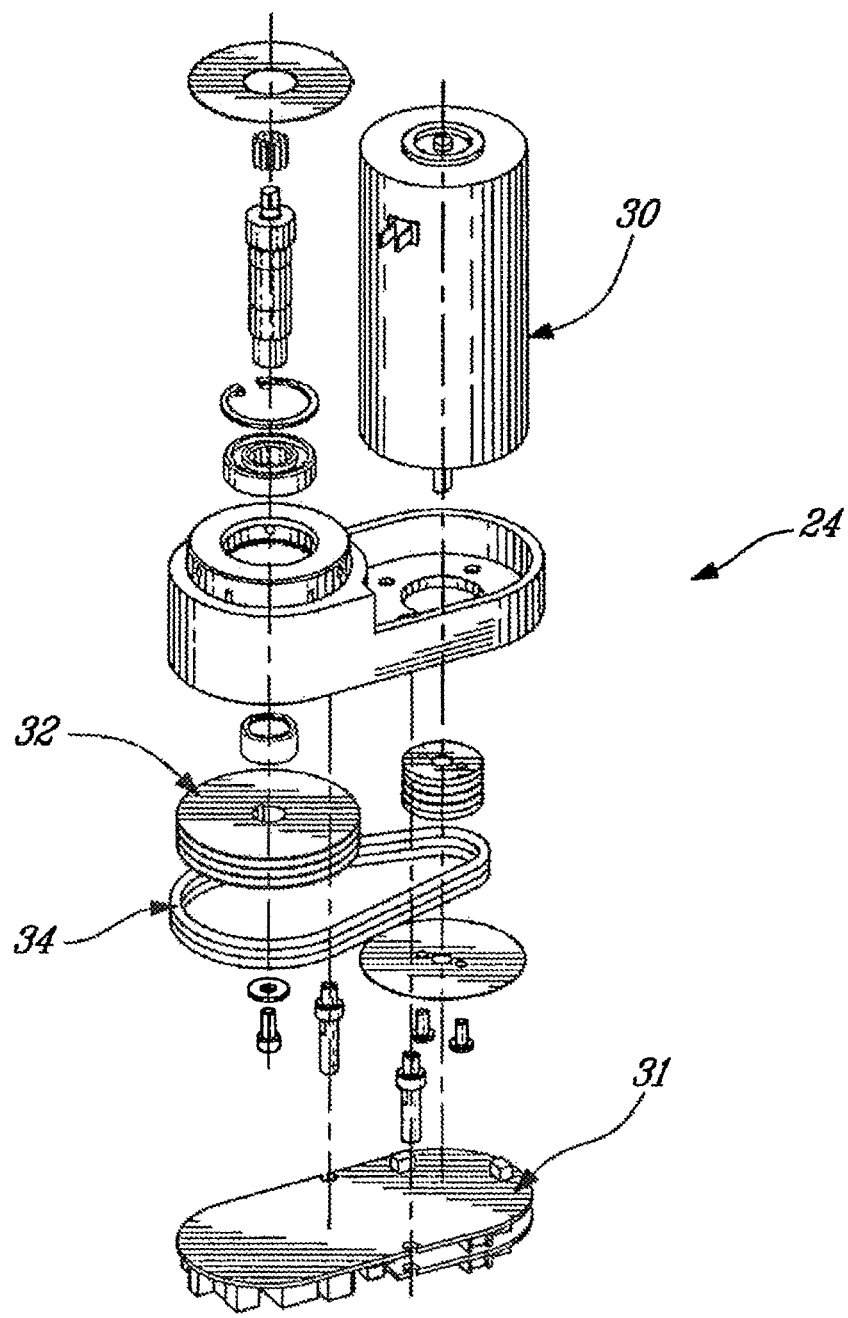
FIG. 6 is an exploded view of an input drive unit of the operator unit of FIG. 4.

As seen in FIG. 6, the input drive unit 24 comprises the motor 30, a pulley 32 using a belt 34, and the controller 31.

The pulley 32 is connected to a first stage planetary sun gear 23 of the output drive unit 22 (see FIG. 13). The sun gear 23 drives a first stage planetary gear consisting of three plastic planet gears 38 driving an output carrier 40. The output carrier 40 drives a second set 42 of three planet gears, which are cut or powdered metal gears driving drives an intermediate carrier 44. The intermediate carrier 44 drives a final set of five planetary gears 46, which are cut or powdered metal gears driving the output shaft 48.

The use of a pulley and belt arrangement allows for a parallel rotational axis structure of the door operator assembly, which allows the motor 30 to be positioned next to the gear train (see FIG. 13). Alternatively, a set of straight spur or helical spur gears may be used instead of the pulley arrangement to allow for an increased reduction ratio.

As a result, the door operator assembly is extremely compact while maintaining high strength and high efficiency. For example, the overall dimensions of the operator unit 10 are approximately 8" tall, 8" wide (including battery pack), and 2.5" thick.

An eccentric is used to load the spring assembly in the output drive unit 22 and provide torque to close the door, which offers the ability to control the force profile of the door. As shown in FIG. 5, the output shaft 48 is connected to an eccentric 27. As the output shaft 48 is rotated, the eccentric 27 causes a roller assembly 35, shown in FIG. 16, to move and compress two-nested helical compression springs 33 and 37. The linear force of the springs 33 and 37 results in a torque in the closing direction on the output shaft 48. By modifying the profile of the eccentric 27, the torque on the door can be controlled to be a constant through the range of door motion.

Alternatively, the profile of the eccentric 27 can be modified to provide increased torque near the closed position of the door as is often desired to ensure proper door closing in conditions where there is wind or stack pressures which tend to push the door open. This provides for a smooth manual opening feel to the user and ensures reliable closing of the door.

The eccentric 27 design allows the use of robust compression springs instead of commonly used clock type springs, which are known to fail prematurely. Moreover, since clock type springs only provide torque in one direction, door operators using this type of spring system are handed and require disassembly to reverse the handing thereof. By making the profile of the eccentric 27 symmetrical, the present door operator can be used in either direction and allows for use of a same door operator on either a left or a right hand door.

Interestingly, once the present door operator assembly is installed on the door, the spring force may be adjusted by a spring adjustment set screw 39, whereas other door operators require the door arms to be repositioned, the header to be opened for access, or the door operator to be removed from the header to adjust the spring force.

The spring assembly absorbs energy when the door is opened and stores that energy for use later in closing the door, which is typically required to allow the door to close when no power is supplied to the door operator assembly, as in a case of power failure for example. Each time the door is opened by a person, energy is applied to the door and stored in the spring assembly, the thus stored energy being then released to close the door. The motor is used as a generator, the excess energy released by the spring assembly is recaptured to be stored in the self-contained power pack, each manual cycle being used to recharge the power pack.

When the present door operator is battery powered and able to capture energy on the open cycle by using the motor as a generator, as will be described hereinafter, it is possible to use the power pack to temporarily store the power, instead of a spring. The energy can then be released into the motor to close the door. In such an alternative embodiment, the door operator does not comprise any spring assembly, which reduces the number of parts required and hence the total cost.

In FIG. 3, the linkage comprises a shock absorbing door arm 16 and a drive arm unit 14. The output shaft 48 is supported by a housing 45 (see FIG. 13). The output shaft 48 is connected to the drive aim unit 14 as shown in FIG. 5.

Figure 8A:
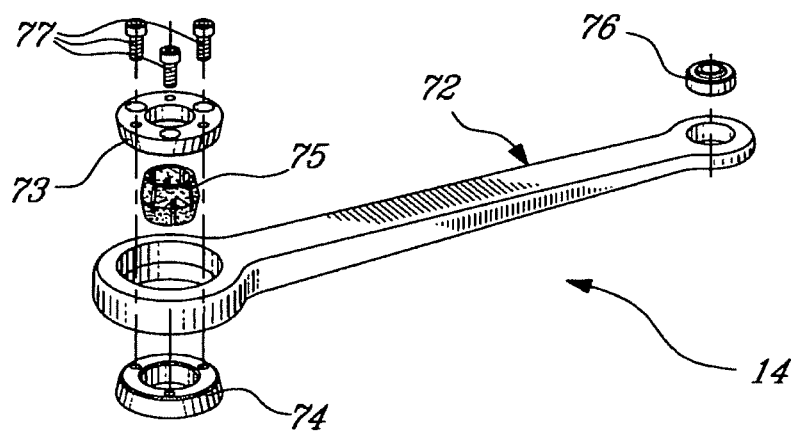
FIG. 8a) is an exploded view and FIG. 8b) is a sectional view of a drive aim unit of a door operator assembly according to the present invention.
Figure 8B:
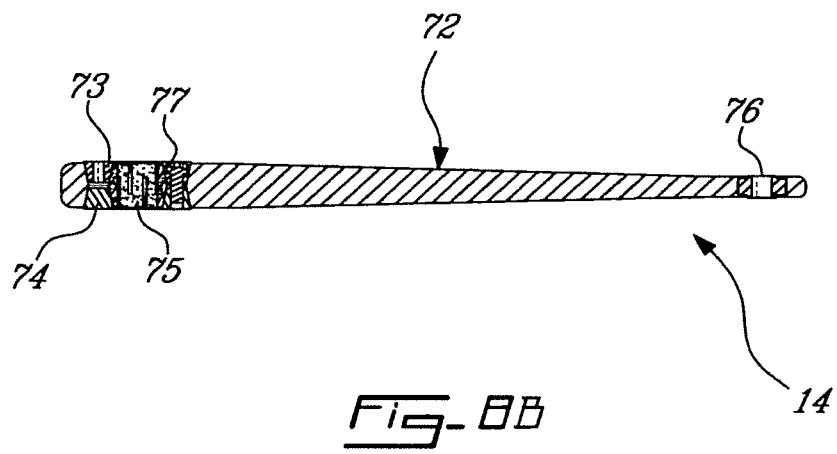

As shown in FIG. 8, the drive arm unit 14 comprises a main arm 72, which has a spherical bearing 76 at a first end and a shaft coupling assembly consisting of a tapered mandrel 75 and two tapered collars 73, 74 held together with three fasteners 77 at a second end. Such tapered coupling between the door arm and the output shaft, compared to conventional splined or square shape on the output shaft of the operator unit, allows the arm to be attached in a range of positions on the door operator output shaft, and provides a robust connection to the output shaft 48.

Figure 9A:
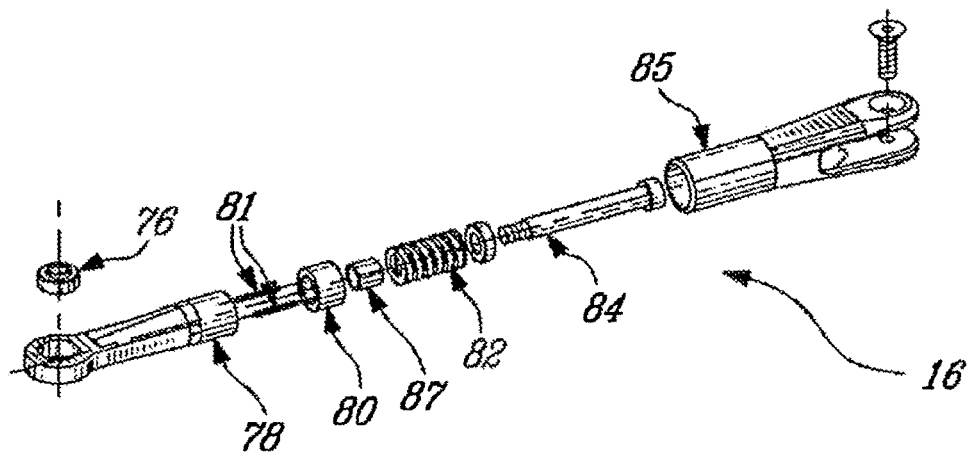
FIG. 9a) is an exploded view and FIG. 9b) is a sectional view of an adjustable length shock absorbing arm unit according to the present invention.
Figure 9B:
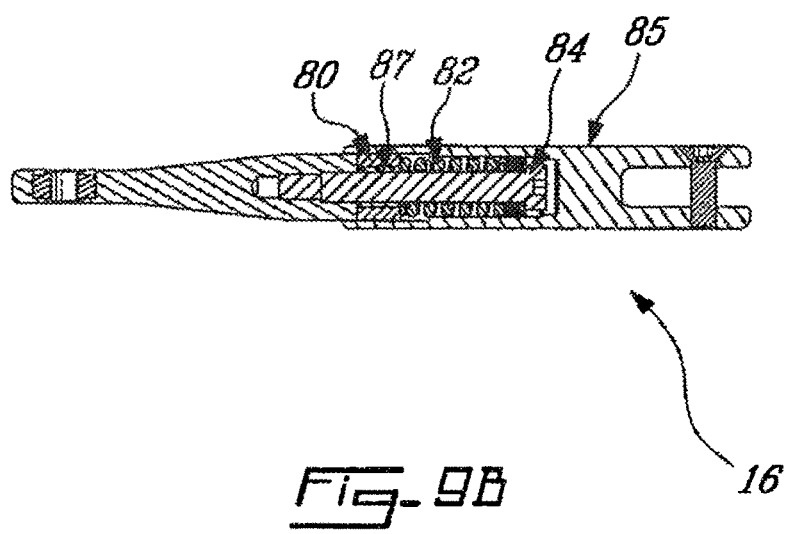
Figure 10A:
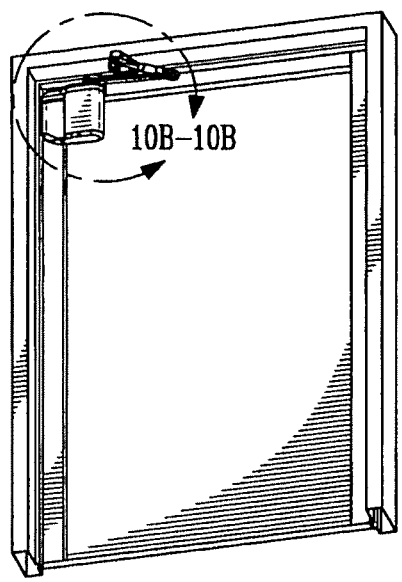
FIGS. 10A and 10B, hereinafter collectively referred to as FIG. 10, are views of a door operator assembly according to an embodiment of the present invention.
Figure 10B:
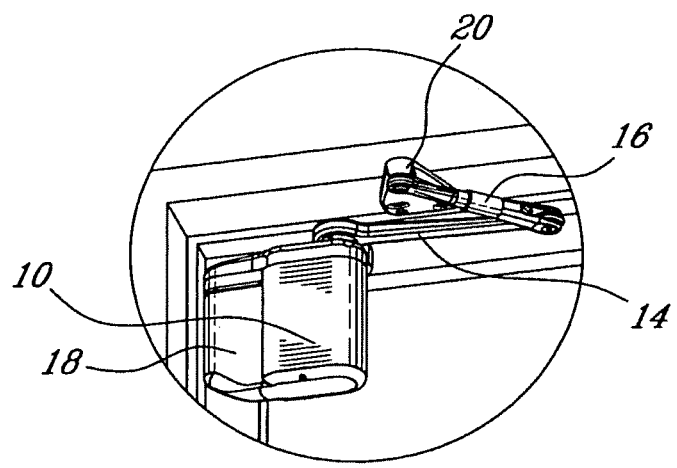

As shown in FIG. 9, the shock absorbing door arm 16 comprises a solid arm 78 and a hollow arm 85, which are connected through a threaded housing 80 and a plastic bearing 87 by means of a shock-absorbing medium 82, such as a spring or a closed cell polyurethane for example. A shoulder bolt 84 is used to preload the shock absorbing door arm 16 when connected to the solid arm 78. Length adjustment is accomplished by rotating the hollow arm 85 in relation to the threaded housing 80, which is fixed to the solid aria 78 through two dowel pins 81.

The shock absorbing door arm 16 reduces the impact force frequently caused by wind or abuse, which are common causes of system failure. Contrary to hydraulic dampening currently used, wherein an hydraulic fluid is used to control the speed of the door on the closing cycle, the shock absorbing arm allows absorbing the shock occurring when the door is forced in the full open position, or when wind causes an impact when the door hits the open position. In contrast, typical hydraulic systems fail to absorb an impact when the door is in the open position.

The shock absorbing door arm 16 is attached on a first end to the second mounting bracket 20, which is mounted on the frame of the door through a spherical bearing 76 (see FIG. 9), and on a second end to the drive arm unit 14 as shown in mounting configurations illustrated in FIGS. 10, 12, 14, 15 for example.

Figure 11A:
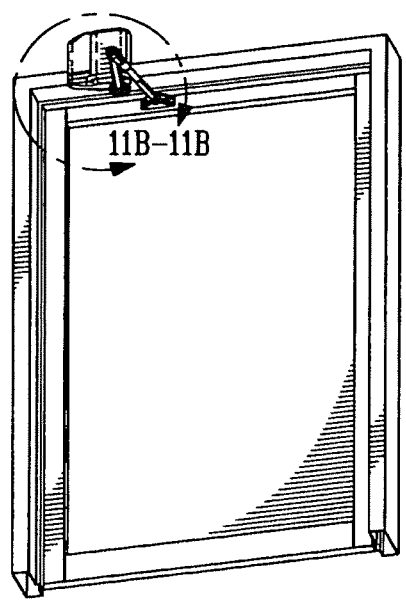
FIGS. 11A and 11B, hereinafter collectively referred to as FIG. 11, are views of a door operator assembly according to an embodiment of the present invention, mounted in a first alternative configuration.
Figure 11B:
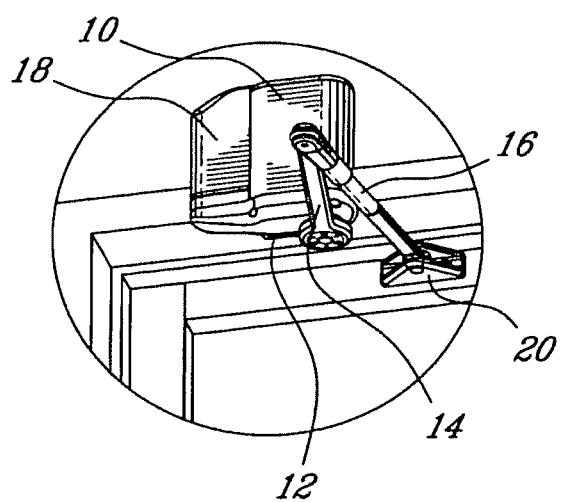

In an alternative mounting arrangement as shown in FIG. 11, the second mounting bracket 20 is affixed to the door.

Figure 15A:
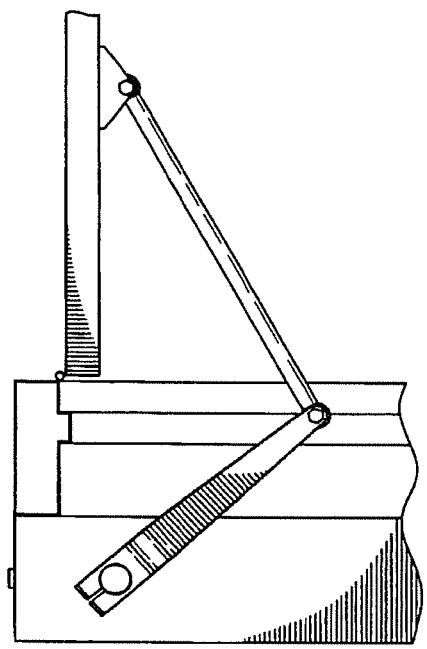
FIG. 15a is a top view of a linkage of a door operator assembly as known in the art.
Figure 15B:
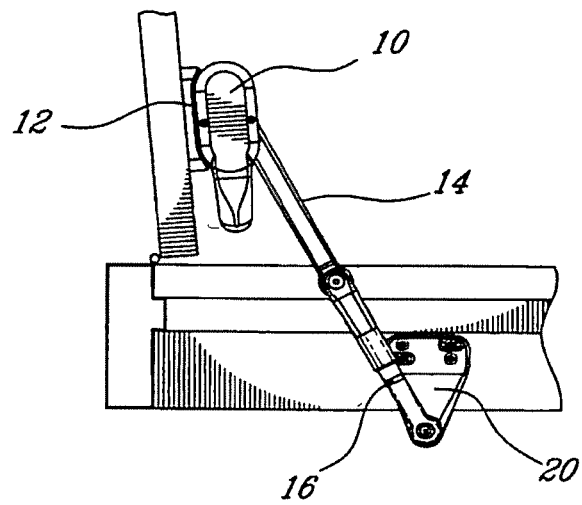
FIG. 15b is a top view of a linkage of a door operator assembly according to an embodiment of the present invention.

As may be seen in FIG. 15b, the drive arm unit 14 and the shock absorbing door arm 16 maintain a linear alignment when the door is fully opened, thereby reducing stress on the door operator assembly and on the mounting brackets. People in the art will appreciate that linear alignment of the door arms implies that the arms are in either tension or compression, and have no bending loads, which reduces stress on the door operator assembly.

Figure 7A:
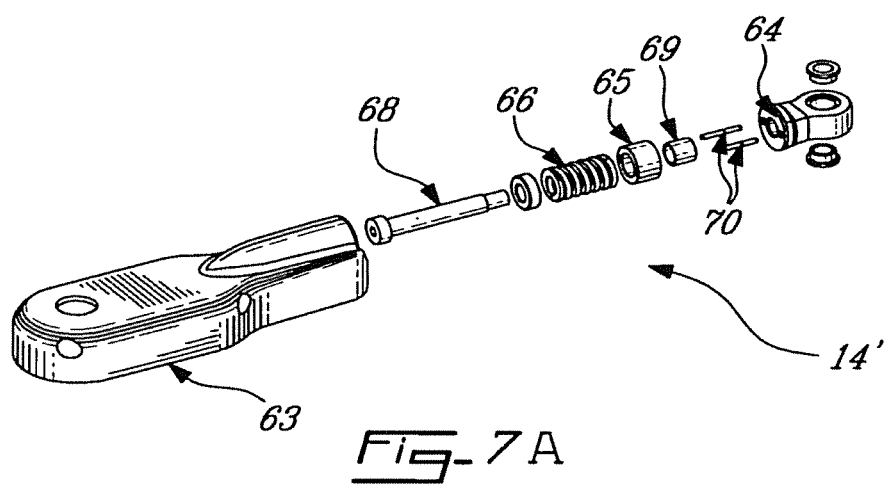
FIG. 7a) is an exploded view and FIG. 7b) is a sectional view of an integrated door for a door operator assembly according to the present invention.
Figure 7B:
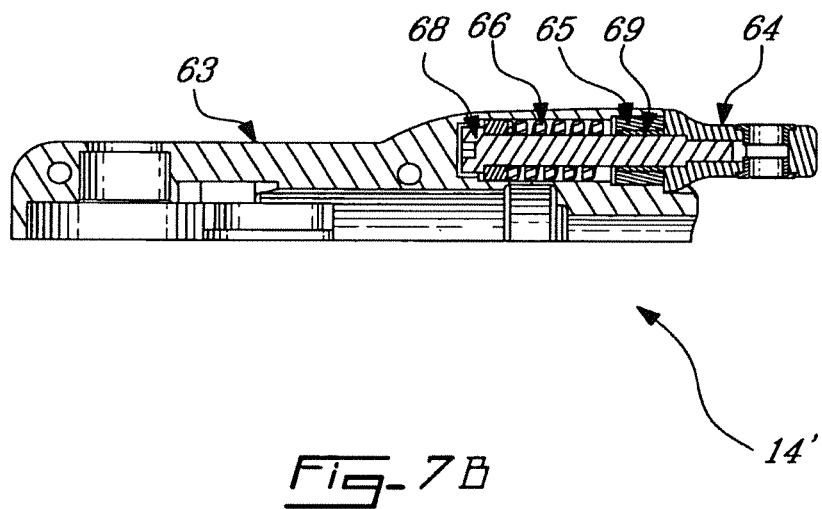
Figure 14A:
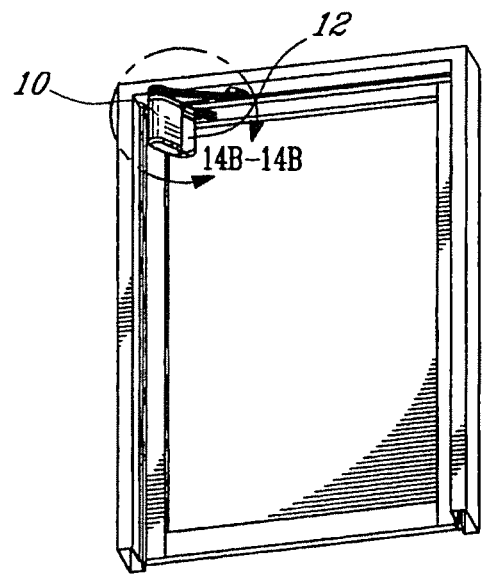
FIGS. 14A and 14B, hereinafter collectively referred to as FIG. 14, are views of a door operator assembly according to an embodiment of the present invention, mounted in a third alternative configuration.
Figure 14B:
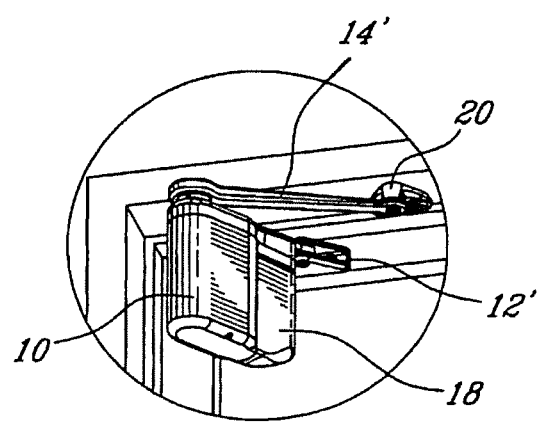

Depending on the selected mounting arrangement, the drive arm unit 14 and the shock absorbing door arm 16 may be integrated into an aim unit 14' as shown in FIG. 14. As shown in FIG. 7, the integrated aim unit 14' comprises a housing 63, a linkage attachment 64, which is connected to the housing 63 through a bearing support 65 and bearing 69 by means of a shoulder bolt 68 held in place by a heavy spring 66.

The door operator assembly of the present invention incorporates a closed loop control circuit and a regenerative drive circuit, effective in both the open and closing directions. The controller constantly monitors door speed and position, in such a way that if the door begins to move faster than a predetermined speed, the motor is used as a generator to remove the energy from the door and slow the door down. This allows the energy to be absorbed over relatively long period of time and dramatically reduces the forces on the door when the full open position is reached, as opposed to a traditional door system using a stop to absorb impact energy upon the full open position. The excess energy is used to recharge the power pack.

The regenerative drive circuit also allows gaining energy from a manual opening of the door. Since the controller monitors the speed of the door, any excess energy applied by a user to the door can be stored in the power pack, as a way to eliminate this excess energy from rapid manual opening, which reduces the stress and wear on the operator unit.

To further reduce abusive forces on the door operator assembly, as described hereinabove, the shock absorbing door arm absorbs the impact of a large, heavy door operating at maximum allowed speed when it reaches full open or if the door is subject to impact by a person or object.

As mentioned hereinbefore, the use of the regenerative drive circuit in both the open and close directions of operation allows an alternative where the energy storage springs and related components may be eliminated, providing storing the energy from the open cycle in the power pack for use to provide power to the motor to close the door.

Moreover, the closed loop control circuit whereby the controller calculates the approximate inertia of the door by monitoring the power (voltage and current) provided to the door and the resulting speed of the door, may be used so that the controller automatically set the speeds and forces of the door to meet standard limitations. This feature in the control of the door ensures safe installation by those not familiar with standard requirements and dramatically reduces the installation time of the operator.

From the foregoing, it should now be apparent that the present door operator assembly is easily installed without expert knowledge. Moreover, being powered by a self-contained power pack, which is recharged during manual use, it does not require external wiring.

Interestingly, the present door operator assembly may be mounted to a door without the need for custom work to either the operator unit or the mounting surface of the operator unit. Using a separate mounting bracket allows to easily mount the bracket to the door and to apply the operator unit to the mounting bracket on two guideposts (see FIG. 3). Provision of a length-adjustable shock absorbing door arm allows easily adjusting the door arm length and further facilitate easy installation.

As mentioned hereinabove, depending on the door width and height or customer preferences, a range of mounting arrangements may be contemplated.

The first mounting bracket 12 may be mounted in a traditional, above the frame, configuration as shown in FIG. 11, while the second mounting bracket 20 is mounted to the door, the door operator mounting to the first mounting bracket 12, which mounts to the top of the doorframe.

Figure 12A:
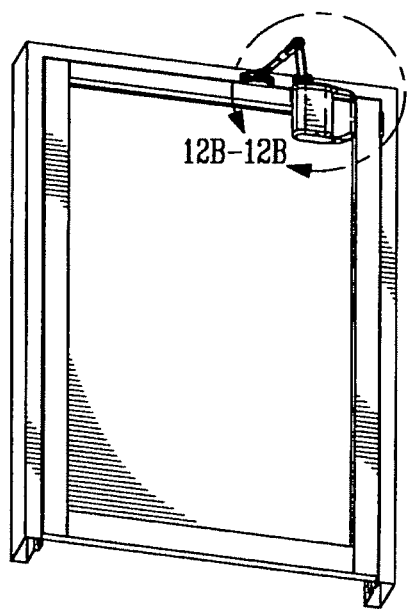
FIGS. 12A and 12B, hereinafter collectively referred to as FIG. 12, are views of a door operator assembly according to an embodiment of the present invention, mounted in a second alternative configuration.
Figure 12B:
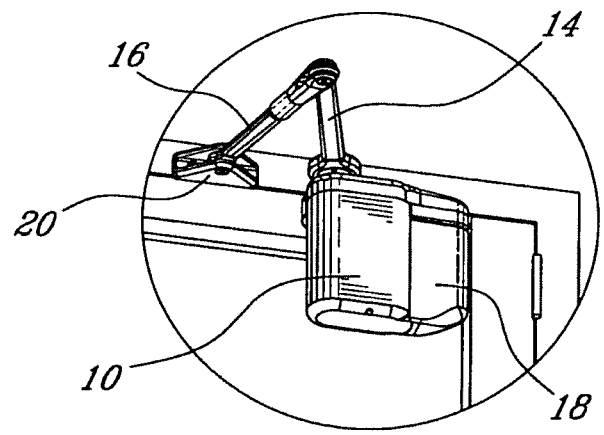

In FIG. 12, the first mounting bracket 12 is mounted to the opposite face of the door, to accommodate for in-swing applications, and the second mounting bracket 20 mounts to the frame of the door.

Figure 17A:
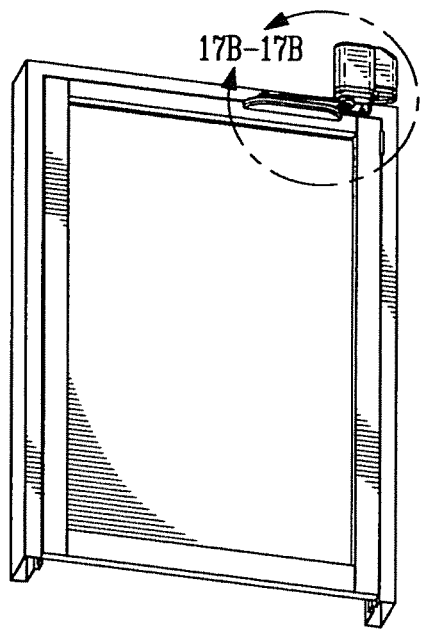
FIGS. 17A and 17B, hereinafter collectively referred to as FIG. 17, are views of a door operator assembly according to an embodiment of the present invention, mounted in a fourth alternative configuration.
Figure 17B:
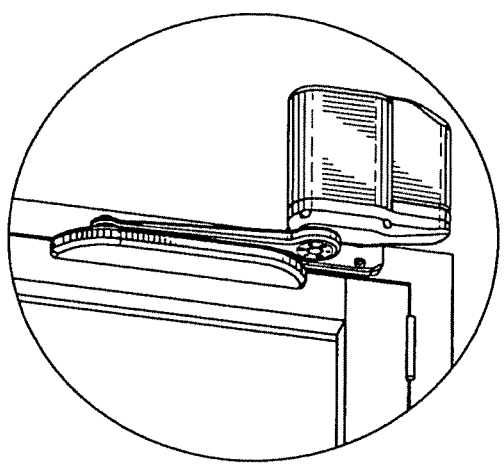

In FIG. 17, the first mounting bracket 12 is mounted to the opposite frame of the door, to accommodate for in-swing applications. In this embodiment, a track is mounted to the face of the door through a slider block.

In FIG. 14, the second mounting bracket 20 is mounted on the doorframe, and the operator unit 10 is mounted to the door by an adaptor 12'.

As shown in FIG. 15(b), in the full open condition, the linkage is in a straight line so the door arms are in tension only. This means there is no torque on the door operator assembly itself and, since the arms are not subject to bending, the stress on the door arms is lower. The shock-absorbing arm further reduces the stress on the door itself.

Therefore, the present door operator assembly, instead of being placed above a door in a large header, may mount directly between the frame and the door, which dramatically reduces the complexity of installation. Alternative mounting arrangements may be contemplated, depending on customer requirements. Using an optional mounting plate, the present door operator assembly may be mounted to the interior or exterior face of the door, in swing or out swing application, or may be mounted on the interior or exterior above the door, on the doorframe. This allows accommodation of condition where the door operator may not be mounted in the clear door area, for doors under 36" for example, for door with limited space behind the door, or for doors where the space above the door is limited, in the cases of high doors or low ceilings for example.

People in the art will appreciate that mounting the door operator assembly between the front face of the door and the bottom of the frame dramatically simplifies installation, compared with typical door operators that mount above the frame and require shimming or reinforcing of the frame. The mounting arrangement between the bottom of the frame and face of the door does not require reinforcing the frame or any shims, since the frame has existing support where the door operator mounts. A mounting plate may be used depending on the reveal of the door. Such mounting arrangement also eliminates issues where not enough space over the door is available to mount the door operator assembly. Alternative mounting arrangement comprises mounting the door operator assembly on the frame above the door or on the in-swing face of the door.

From the above, people in the art should now be in a position to appreciate that the present invention provides a door operator assembly, connected to the frame of the door by means of a pivot instead of being fixedly mounted to the frame of the door or to the face of the door, which allows the door operator assembly to more or less "float" in the doorway. This mounting arrangement is much simpler than traditional mounting arrangements in a box above the door, which often requires reinforcing of the area above the door.

The present door operator assembly may be operated by a power pack alone, if desired, since the power pack may be recharged by using the motor as a generator during manual opening and spring closing of the door as described hereinbefore, which allows using only the power pack to operate the door even though the power pack has a limited energy storage. Such a feature eliminates the need to have a licensed electrician bring power to the door and eliminates the need for any electrical cords to the door operator. It may be further contemplated having the door operator plugged in for doors that are typically power operated rather than typically manually operated.

The present door operator assembly may also be used as a power-assisted door opener, by supplying only enough power to the door to reduce the force required to open the door, the door having no minimum hold open time in this case. The force of the door operator, in a power-assisted mode, is controlled by the amount of current supplied to the motor. The amount of current is determined in an initial set up of the door to be below the amount of current required to open the door under power for example. Activation of the power assist function occurs when the encoder indicated motion of the door has started.

Alternatively, power assist may be provided by adding measuring the backlash between the door arm and the motor. When pressure is applied to the door and the backlash is taken up, the controller applies power to the door, and, if the backlash is increased, indicating the door is stopped, power may be removed. One method of accomplishing this is by allowing the output stage ring gear to rotationally float plus or minus 2-3 degrees. A pin in a slot may be used to limit the rotation with a switch mounted externally so that when the backlash is taken up, the switch is actuated. Pushing on the door causes the ring gear to rotate and the switch is actuated. The controller may then be used to provide power to the motor and assist in the opening of the door. If the door motion stops, the ring gear rotates in an opposite direction and disengages the switch, thereby eliminating power to the motor. Power is only supplied to the motor as long as there is some pressure on the door.

A method of adjusting the door operator assembly in compliance with ANSI 156.19 standard will now be described. This procedure is commonly called "tune-in" of the door.

According to this standard ANSI 156.19, opening and closing speeds of the door are related to the size and weight of the door and are determined by the equation $T=(D*(W)^{1/2})/133$, where T is the time in seconds, D is the door width in inches, W is the weight of the door in lbs. The time T is determined by inputting the door width and weight into the controller by means of a discrete position potentiometer.

Setup of the door operator is initiated by pressing a switch on the controller twice with the door in the closed position, thus setting the close door position. The 90-degree open position is set by manually opening the door to the 90-degree position and pressing the button on the RF transmitter once.

The hold open time of the door is next set by depressing the button on the RF transmitter the desired number of seconds that the door will be held open. This completes the position input of the setup.

With the closed loop control circuit described hereinabove, the controls can automatically calculate the required door speeds and eliminate the need to manually set the door operator.

The opening force of the door is set by a variable potentiometer and does not exceed a predetermined current limit based on the size of the door. The maximum closing force, with the power close option, is set by a variable potentiometer and does not exceed a predetermined current limit based on the size of the door.

The spring force is set by adjusting the spring adjustment set screw as previously described.

Although the present invention has been described hereinabove by way of specific embodiments thereof, it can be modified, without departing from the nature and teachings of the subject invention as described herein.

The invention claimed is:

1. A door operator assembly for use with a door frame and a door wherein the door is rotatable about an axis of rotation passing through a door hinge connecting the door frame and the door, wherein the door operator assembly moves the door between an open position and a closed positon relative to the door frame and the door is manually movable between the closed positon and the open position by at least one of pushing on a pushing side of the door and pulling from a pulling side of the door, wherein the door operator assembly comprises:

an operator unit operable to drive an arm linkage to move the door from the open position to the closed position, the operator unit mounted to the door on the pushing side thereof and the operator unit comprising an input drive unit and an output drive unit comprising an output shaft rotatable about a first axis;

the arm linkage having a first end and a second end, wherein the first end of the arm linkage is coupled to the output shaft and the second end of the arm linkage is mounted on a portion of the door frame;

wherein, as viewed along an axis of the door that is orthogonal to a longitudinal axis of the door, the operator unit is positioned on the door intermediate the door hinge and the portion of the door frame;

a motor having a drive shaft rotatable about a second axis parallel to the first axis, the drive shaft being able to rotate a sun gear about the first axis and the sun gear driving at least one planetary gear system and the at least one planetary gear system being operatively connected to the output shaft such that the input drive unit and the output drive unit are disposed adjacent one another;

a rechargeable power storage pack for powering the motor comprising at least one of (i) at least one rechargeable battery and (ii) one or more capacitors; and a controller, operatively coupled to the motor, for monitoring a speed and a position of the door as the door is manually moved from the closed positon to the open position, wherein when the door is manually moved faster than a predeteimined speed from the closed position to the open position, the motor is used as a generator to charge the rechargeable power storage pack and the speed of the door is reduced.

2. The door operator assembly of claim 1 comprising a battery indicator.

3. The door operator assembly of claim 1 wherein the controller calculates an approximate inertia of the door.

4. The door operator assembly of claim 1 wherein the arm linkage comprises a shock absorbing door arm.

5. The door operator assembly of claim 4 wherein the arm linkage comprises a drive arm unit, the shock absorbing door arm connected to the operator unit by the drive arm unit, the drive arm unit comprising an arm having a spherical bearing and a tapered shaft coupling assembly.

6. The door operator assembly of claim 4 wherein the shock absorbing door arm comprises a solid arm and a hollow arm connected by a threaded housing, the hollow arm rotating in relation to the threaded housing for length adjustment of the shock absorbing door arm.

7. The door operator assembly of claim 6 wherein a shock-absorbing medium is disposed between the solid arm and the hollow arm.

8. The door operator assembly of claim 1 wherein the operator unit comprises a spring assembly for storing energy when the door is moved from the closed position to the open position, the energy being released when the door moves from the open position to the closed position.

9. The door operator assembly of claim 8 wherein an eccentric is used to load the spring assembly and provide a torque to close the door.

10. The door operator assembly of claim 9 wherein a profile of the eccentric is such that the torque increases as the door moves from the open position to the closed position.

11. The door operator assembly of claim 9 wherein a profile of the eccentric controls a force of the spring assembly such that the torque is constant through a range of door motion.

12. The door operator assembly of claim 9 wherein the eccentric has a symmetric profile.

13. The door operator assembly of claim 1 wherein the motor is one of: i) a brushless DC motor and ii) an ironless core DC brush motor.

14. A combination door operator assembly and door assembly, the door assembly comprising a door frame and a door wherein the door is rotatable about an axis of rotation passing through a door hinge connecting the door frame and the door, wherein the door moves between an open position and a closed position relative to the door frame, and the door is manually movable between the closed positon and the open position by at least one of pushing on a pushing side of the door and pulling from a pulling side of the door, wherein the door operator assembly comprises:

an operator unit operable to drive an arm linkage to provide assistance in moving the door from the closed position to the open position, the operator unit mounted to the pushing side of the door, the operator unit comprising an input drive unit and an output drive unit comprising an output shaft rotatable about a first axis;

the arm linkage comprising a driving arm having a first end and a second end and a driven arm having a first end and a second end, wherein the second end of the driving arm is coupled to the second end of the driven arm, the first end of the driving arm is coupled to the output shaft and the first end of the driven arm is mounted on a portion of the door frame;

wherein, as viewed along an axis of the door that is orthogonal to a longitudinal axis of the door, the operator unit is positioned on the door intermediate the door hinge and the portion of the door frame;

the input drive unit comprising a motor, the motor having a drive shaft rotatable about a second axis parallel to the first axis, the drive shaft being able to rotate a sun gear about the first axis and the output drive unit comprising at least one planetary gear system, the sun gear driving the at least one planetary gear system and the at least one planetary gear system being operatively connected to the output shaft such that the input drive unit and the output drive unit are disposed adjacent one another;

a rechargeable power storage pack for powering the motor and comprising at least one of (i) at least one rechargeable battery and (ii) one or more capacitors; and a controller, operatively coupled to the motor, for monitoring a speed and a position of the door as the door is manually moved from the closed positon to the open position, wherein when the door is manually moved faster than a predetermined speed from the closed position to the open position, the motor is used as a generator to charge the rechargeable power storage pack and the speed of the door is reduced.

15. A combination door operator assembly and door assembly, the door assembly comprising a door frame and a door wherein the door is rotatable about an axis of rotation passing through a door hinge connecting the door frame and the door, wherein the door moves between an open position and a closed position relative to the door frame and the door is manually movable between the closed positon and the open position by pushing on a pushing side of the door and by pulling from a pulling side of the door, wherein the door operator assembly comprises:

an operator unit operable to drive an arm linkage to assist in moving the door from the closed position to the open position and to move the door from the open position to the closed position, the operator unit mounted to the door on the pushing side thereof, the operator unit comprising an input drive unit and an output drive unit comprising an output shaft rotatable about a first axis;

the arm linkage comprising a driving arm having a first end and a second end and a driven arm having a first end and a second end, wherein the second end of the driving arm is coupled to the second end of the driven arm, the first end of the driving arm is coupled to the output shaft and the first end of the driven arm is mounted on a portion of the door frame;

wherein, as viewed along an axis of the door that is orthogonal to a longitudinal axis of the door, the operator unit is positioned on the door intermediate the door hinge and the portion of the door frame;

the input drive unit comprising a motor, the motor having a drive shaft rotatable about a second axis parallel to the first axis, the drive shaft being able to rotate a sun gear about the first axis and the output drive unit comprising at least one planetary gear system, the sun gear driving the at least one planetary gear system about the first axis and the at least one planetary gear system being operatively connected to the output shaft such that the first axis and the second axis are disposed adjacent one another;

a rechargeable power storage pack for powering the motor and comprising at least one of a rechargeable battery and one or more capacitors; and a controller, operatively coupled to the motor, for monitoring a speed and a position of the door as the door is manually moved from the closed positon to the open position, wherein when the door is manually moved faster than a predetermined speed from the closed position to the open position, the motor is used as a generator to charge the rechargeable power storage pack, and the speed of the door is reduced.

* * * * *

UNITED STATES PATENT AND TRADEMARK OFFICE
CERTIFICATE OF CORRECTION

PATENT NO. : 10,077,591 B2
APPLICATION NO. : 14/319076
DATED : September 18, 2018
INVENTOR(S) : Hass Page 1 of 1

It is certified that error appears in the above-identified patent and that said Letters Patent is hereby corrected as shown below:

In the Claims

In Column 9, please change Line 30 to:
"faster than a predetermined speed from the closed"

Signed and Sealed this
Fourth Day of December, 2018

Andrei Iancu
*Director of the United States Patent and Trademark Office*